May 11, 1965    PAO H. CHIN    3,183,372
CONTROL AND SYNCHRONIZING CIRCUIT FOR A WAVE GENERATOR
Filed June 21, 1962    3 Sheets-Sheet 1
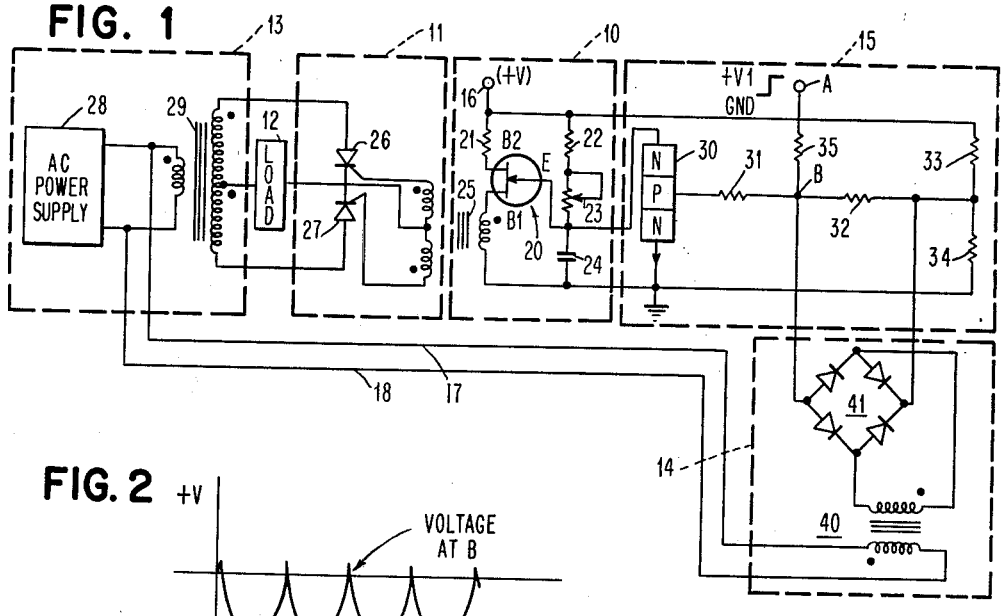
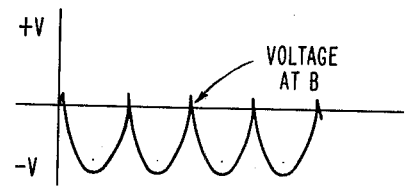
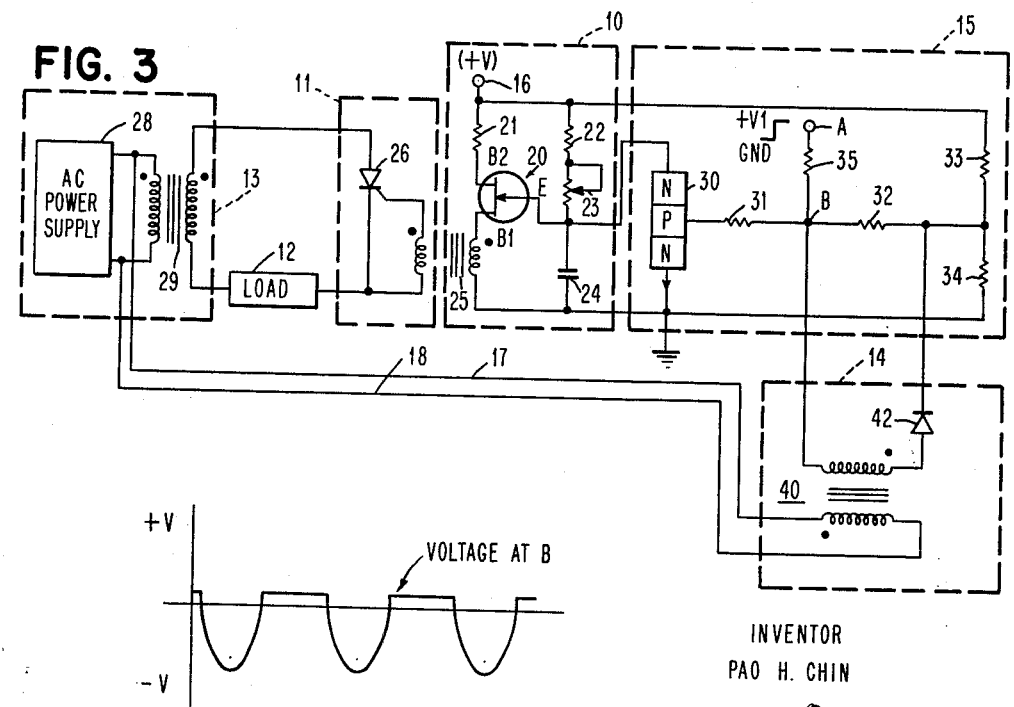
INVENTOR
PAO H. CHIN
BY John F. Opstendorf
ATTORNEY May 11, 1965          PAO H. CHIN          3,183,372
CONTROL AND SYNCHRONIZING CIRCUIT FOR A WAVE GENERATOR
Filed June 21, 1962          3 Sheets-Sheet 2

United States Patent Office 3,183,372
Patented May 11, 1965

3,183,372
CONTROL AND SYNCHRONIZING CIRCUIT FOR A WAVE GENERATOR
Pao H. Chin, Pleasantville, N.Y., assignor to International Business Machines Corporation, New York, N.Y., a corporation of New York
Filed June 21, 1962, Ser. No. 204,202
9 Claims. (Cl. 307—88.5)

This invention relates to control circuitry and, more particularly, to turn On-turn Off and synchronizing circuitry for a wave generator.

In servo systems which utilize electric motors as actuators, the power control circuits for these motors usually employ saturable reactor or other magnetic type wave generators as phase controlled triggering circuits. However, circuits of this type are unduly complex and costly. Consequently, it is desirable that semiconductor type wave generators, such as a unijunction transistor pulse generator, replace those of the saturable reactor or other magnetic type. When such a generator is employed to actuate a trigger circuit for driving a motor or other load circuit, it is necessary to have control circuitry for permitting or inhibiting operation of the generator, as well as to synchronize the operation of the generator with the power supply of the load circuit.

Accordingly, it is a general object of the invention to provide a single simplified circuit which controls the turn On and turn Off of a wave generator and synchronizes its operation with the power supply of a load circuit driven in response to the operation of the wave generator.

It is another object of the invention to provide control and synchronizing circuitry for a wave generator operating in either a full cycle manner or in a half cycle manner.

It is a further object of the invention to provide a control and synchronizing circuit capable of operating in conjunction with a plurality of wave generating circuits.

A further object of the invention is to control and synchronize wave generating circuitry capable of reversibly or unilaterally operating load circuitry.

Still a further object of the invention is to control and synchronize pulse generating circuitry capable of being actuated to produce no pulses or a train of pulses in one synchronizing cycle.

Briefly, the foregoing objects are accomplished by providing circuitry for controlling the conductive state of a wave generator operating to control a full wave or half wave trigger circuit controlling, in turn, the driving of a load. The circuitry includes an input circuit for receiving a signal capable of residing at a first or a second level and signal responsive means operative to permit conduction of the generator when the signal is at the first level and operative to disable the generator when the signal is at the second level. Means are also provided in the circuitry, and coupled to the signal responsive means and to the power supply of the load, for synchronizing the conduction of the generator with the powering of the load when the signal responsive means responds to the signal at the first level.

In accordance with one aspect of the invention, a unijunction transistor pulse generator is connected to produce pulses for firing a trigger circuit. The trigger circuit operates to control the driving of a load circuit, such as the armature of a D.C. motor. Signal responsive means, such as a transistor, operate in response to a voltage produced by a circuit coupled to the load power supply to synchronize the conductivity of the pulse generator with the cyclical operation of the supply. The signal responsive means also responds to an input signal to permit conduction of the pulse generator or to disable it.

A feature of the invention permits the wave generating circuitry and the control and synchronizing circuit to be employed for full wave or half wave control of the load circuit.

Another feature of the invention enables a pair of pulse generators to be employed with difference amplifier circuitry to produce trains of pulses in one synchronizing cycle to drive the load circuit either reversibly or unilaterally.

The foregoing and other objects, features and advantages of the invention will be apparent from the following more particular description of the preferred embodiments of the invention, as illustrated in the accompanying drawing, wherein:

FIGURE 1 is a diagram of the circuitry according to the invention which is connected to provide full cycle wave generator synchronization;

FIGURE 2 is a waveform diagram of the synchronizing signal developed in the circuit of FIGURE 1;

FIGURE 3 is a diagram of the circuitry of the invention employed to provide half cycle wave generator synchronization;

FIGURE 4 is a waveform diagram of the synchronizing signal developed in the circuit of FIGURE 3;

Figure 5:
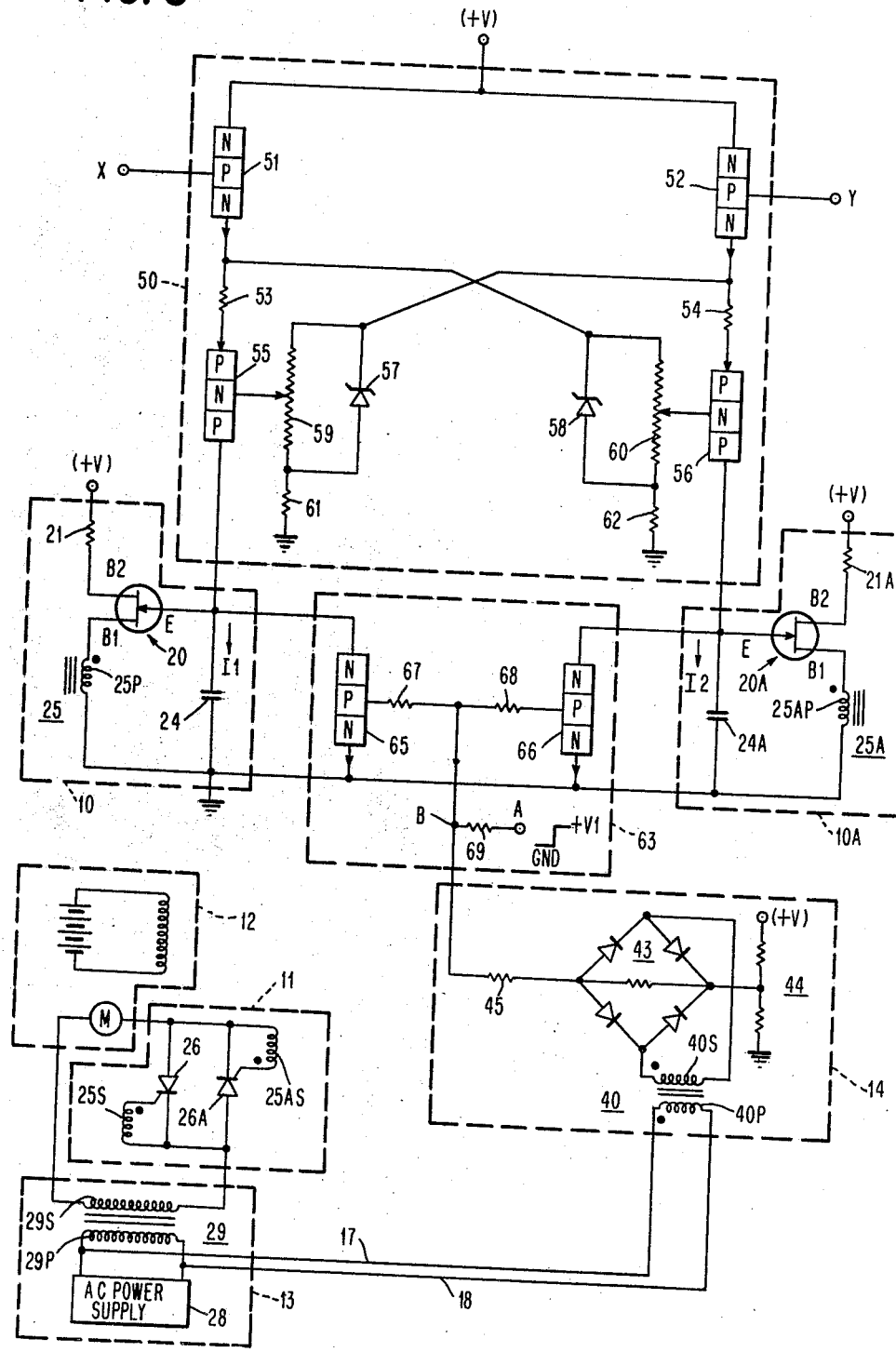
FIGURE 5 is a circuit diagram of another embodiment of the invention employing the control circuitry in conjunction with a cross-biased difference amplifier and a pair of wave generators.

Referring now to FIGURE 1, the basic circuit according to the invention comprises in block form a wave generator 10 for producing pulses to fire a trigger circuit 11 which controls, in turn, the operation of a load circuit 12. Load circuit 12 is powered from the circuit 13 which is also connected by leads 17 and 18 through a coupling circuit 14 to a control circuit 15 for the wave generator.

Wave generator 10 is a conventional pulse generator employing a unijunction transistor 20 having a single rectifying junction (emitter electrode E) disposed intermediately of two spaced bilaterally conductive electrodes (base electrodes B1 and B2). As is well-known in the art, a unijunction transistor has a negative resistance region in its volt-ampere characteristic. If a unidirectional bias is applied between the electrodes B1 and B2, and the electrode E is biased at a potential intermediate the potentials of B1 and B2, the transistor 20 can be made to operate in a high impedance condition. This condition is in the potential region at which the voltage at the junction is nearly zero providing minimum current flow in the junction. When a forward bias is applied to the junction (for example, by a signal source) current flows between B1 and E, and B1 and B2 resulting in the impedance of the device sharply changing to a low impedance condition.

Biasing for the electrode B2 is provided through a resistor 21 from a positive voltage supply (+V) connected to a terminal 16 and biasing for the electrode E is provided from the same source through a resistor 22 and a potentiometer 23. Electrode B1 is connected to ground reference potential through the primary winding of a transformer 25 which is preferably of the pulse transformer type. Normally, this biasing arrangement maintains the transistor in a high impedance condition and very little current is supplied to the transformer 25. Application of a signal for changing the impedance condition of transistor 20 is accomplished by discharging a capacitor 24 connected between the electrode E and ground reference potential. Charging of capacitor 24 is accomplished by controlling the current supplied by resistor 22 and potentiometer 23. Other current controlling arrangements may be employed in place of these elements. For example, a transistor may be utilized as a variable current source in response to a control signal.

The secondary windings of transformer 25 are connected in the trigger circuit 11 to fire gating devices, such as the silicon controlled rectifiers (SCR) 26 and 27. The SCR's, in turn, drive the load circuit 12 which may take the form of the armature of a motor. Load circuit 12 is powered from an A.C. power supply 28 through a transformer 29. The opposite ends of the secondary winding of transformer 29 are connected to the anodes of the SCR's 26 and 27.

As thus far described, the wave generator 10 is not supplying a current pulse to the transformer 25; the unijunction transistor is in a high impedance condition and potentiometer 23 is supplying current to charge capacitor 24. When the voltage on capacitor 24 reaches a critical value (determined by the characteristics of the unijunction transistor 20 and the bias voltage at electrode B2) the electrodes E and B1 become conducting. Capacitor 24 discharges its stored energy through electrodes E and B1 to the primary winding of pulse transformer 25. A pulse is produced at the two secondary windings of transistor 25 to trigger the gates of the SCR's 26 and 27. The SCR having a positive voltage on its anode fires to conduct current from the secondary winding of transformer 29 driving the load circuit 12. The other SCR has a negative voltage at its anode and is not triggered. After capacitor 24 discharges and its stored energy is conducted through the electrodes E and B1 of transistor 20, conduction through these electrodes ceases. Recharging of the capacitor 24 is begun by the current flowing through potentiometer 23. Thus, each time that the capacitor discharges, a pulse of current is supplied to trigger alternately the SCR's to control the driving of the load circuit.

The circuits described above are conventional circuits and no invention is deemed to reside in any of them. As already noted, the invention is directed to the control and synchronizing circuitry for the wave generator 10, and, therefore, it should be understood that other types of wave generators or trigger circuits may be employed without departing from the invention.

The control circuit 15 comprises a transistor 30 connected in common emitter circuit configuration to ground reference potential. Resistors 31 and 32 are connected to the base of transistor 30 and to a voltage divider comprising the resistor 33, which is coupled to the terminal 16, and the resistor 34, which is coupled to ground reference potential. An input terminal A is connected through a resistor 35 to the common connection of the resistors 31 and 32 to supply an input signal capable of residing at one of two levels (ground or $+V_1$) to the base of transistor 30. The collector of transistor 30 is directly coupled to the electrode E of the unijunction transistor 20.

When a positive potential ($+V_1$) is applied to terminal A, the base of transistor 30 becomes positively biased. The transistor is rendered conductive and effectively acts as a short circuit across the capacitor 24. The capacitor is discharged and prevented from charging to a potential higher than the saturated potential across the collector and emitter of transistor 30. Under this condition, the generator 10 is turned off. When the input signal is at ground level, the base of transistor 30 is slightly forward biased with respect to emitter, allowing the synchronizing voltage developed across resistor 32, by coupling circuit 14, to control the conduction of transistor 30. Under this condition, transistor 30 is turned off to allow capacitor 24 to be charged by the current through resistor 22 and potentiometer 23. The transistor 30 is then turned on by the synchronizing signal to discharge capacitor 24 synchronizing the generator 10 with the power supply 28. Thus, by using a single transistor and supplying it with an appropriate signal, an effective turn On-turn Off control for the wave generator is provided.

In order to synchronize the operation of the wave generator 10 with the powering circuit 13 for the load circuit 12, an arrangement is provided for coupling the power supply signal to the control circuit 15. The power supply signal is coupled through the leads 17 and 18 to the primary winding of a transformer 40 in the coupling circuit 14. The synchronization signal is developed by a low voltage secondary winding of transformer 40 and is rectified by a full wave bridge circuit 41. The rectified synchronization signal is a low voltage signal substantially equal to the positive potential $+V_1$ applied at the terminal A. It is applied across the resistor 32 and appears at the node B. The potential at this node with the ground input signal applied at terminal $A_1$ is shown in FIGURE 2. Each time the potential goes positive the base of transistor 30 is raised to a positive value to render the transistor conducting to short circuit the capacitor 24 causing it to discharge. The charging of capacitor 24 resumes as soon as node B becomes negative.

Consequently, when a turn On signal (ground level) is supplied at A to the wave generator, the capacitor 24 is discharged each time the synchronizing signal goes to zero. Thus, the start of the charging of the capacitor is synchronized with the signal produced by the A.C. power supply 28. For a particular setting of the potentiometer 23, a pulse is generated at a predetermined fixed time interval after the voltage zero has occurred.

The circuit of FIGURE 1 produces firing pulses in both half cycles to the A.C. power supply and consequently, it is normally used with a full wave trigger circuit. For a half wave circuit, pulses need be generated during one-half cycle of the A.C. power supply voltage only. For this purpose, the circuit of FIGURE 1 may be modified as shown in FIGURE 3 for half cycle control and synchronization.

In the circuit of FIGURE 3, wherein like elements are indicated by the same numeral or literal designation, the pulse transformer 25 is provided with one secondary winding and the firing circuit 11 includes one gate, SCR 26, for driving the load circuit 12. The coupling circuit 14 does not require a full wave rectification bridge and employs a single rectifying device 42 connected to the secondary winding of the transformer 40. In the same manner as described for the circuit of FIGURE 1, the power supply signal is coupled through the leads 17 and 18 to the transformer primary 40. A low voltage synchronizing signal is developed in the secondary winding of the transformer 40 and is rectified by the device 42 to be applied across the resistor 32.

The synchronizing signal appearing at node B, with the ground input signal applied at terminal A, is shown in FIGURE 4. During the half cycle when the voltage at node B is positive, capacitor 24 is short circuited by the transistor 30 as previously described and the generation of any pulses by the wave generator 10 is inhibited. During the other half cycle, the capacitor 24 is not short circuited by transistor 30 and the firing pulses are generated by the wave generator 10 in the normal manner.

Each of the circuits described above has been shown and described as employing a single wave generator of the unijunction transistor type. It is to be understood that the invention is not so limited and the control and synchronization circuit in each of these circuits may be employed with two or more wave generators. This may be accomplished by connecting an additional control transistor, such as the transistor 30 of FIGURE 1 to the node B of the control circuit 15, so that it can receive the input signal as well as the synchronizing signal.

The circuit of FIGURE 1 provides for the generation of a pulse by wave generator 10 during each one-half cycle of the A.C. power supply signal. This pulse is also synchronized with the A.C. power supply signal once each half cycle of the power supply signal. Except for the setting chosen for potentiometer 23, no provision is made in this circuit for generator 10 to provide a train of pulses during a half cycle of the power supply signal, nor is any provision made (aside from the setting of potentiometer 23 or the inhibiting of the turn On-turn Off control circuit 15) for preventing the generator from supplying pulses to fire the trigger circuit. According to another embodiment of the invention, as shown in FIGURE 5, both of these objectives may be accomplished. In this circuit, those portions which are the same as that described in FIGURE 1 have the same reference numerals and those portions which are similar but form an added part of the circuit are given the suffix A. In addition, the primary and secondary windings of the transformers are given the suffixes P and S, respectively.

Referring to FIGURE 5, a pair of wave generators 10 and 10A are connected as load circuits to the branches of a cross-biased difference amplifier 50. Difference amplifier 50 is of a type described with greater particularity in copending application, Serial No. 204,159, filed June 21, 1962, in the name of William T. Harnett and assigned to the same assignee as this invention. As described in this application, this circuit includes bias networks for cross coupling the respective branches of the circuit to the opposite branch.

Each branch of the difference amplifier 50 includes a transistor 51 and 52 connected in common collector configuration to receive X and Y differential input signals, respectively. These transistors drive a transistor 55 and 56, respectively, connected as a common base amplifier in its own branch and control the bias applied to the amplifier in the opposite branch. Driving of the transistor amplifiers 55 and 56 is accomplished through the resistors 53 and 54, respectively. The wave generators 10 and 10A are connected to the collectors of the transistors 55 and 56, respectively.

The bias networks include a Zener diode 57, 58 connected in parallel with a potentiometer 59, 60 and through resistors 61, 62 to ground reference potential. Dependent on the settings of the potentiometers, the current flow $I_1$, $I_2$ through the transistors 55, 56 can be adjusted to be equal or unequal to compensate for variations that exist in the wave generating circuits 10 and 10A. Additionally, this current flow may be adjusted to permit periodic conduction of the unijunction transistors 20 and 20A or the bias applied to the transistors 55 and 56 may be adjusted to prevent conduction of the unijunction transistors. As emphasized in the foregoing copending application, the Zener diodes 57 and 58 render the difference amplifier unaffected by changes in the common mode or zero error signal applied at X and Y.

If it is assumed that the currents $I_1$ and $I_2$ are adjusted to be equal and sufficient to charge periodically the capacitors 24 and 24A, conduction of the unijunction transistors 20 and 20A occurs when the critical voltage of the capacitors 24 and 24A is exceeded (determined by the characteristics of the unijunction transistors 20 and 20A and the biasing applied to the electrodes B2 of these transistors). When the capacitors 24 and 24A discharge, a pulse of current is supplied to the primary windings 25P and 25AP of the transformers 25 and 25A developing a trigger pulse in the secondary windings 25S and 25AS. Each of the secondary windings 25S and 25AS is connected to a gating device, such as the SCR's 26 and 26A. In response to a pulse of current, the SCR having a positive voltage at its anode is triggered to conduct current to drive the load circuit 12, which may take the form of the armature of a separately excited shunt-field D.C. motor. Since the positive voltage is alternately provided at the anodes of the SCR's during each half cycle of the signal provided by the A.C. power supply 28, triggering does not occur in simultaneous manner. The current flow through the SCR's is approximately equal in magnitude, but in opposite directions and, therefore, the motor of the illustrative load circuit 12 remains stationary.

The signal provided by the A.C. power supply 28 is coupled to a control circuit 63 through the leads 17, 18 and the coupling circuit 14 in the manner previously described for FIGURE 1. A low voltage signal is developed by the secondary winding 40S from the power supply signal supplied to the primary winding 40P. This low voltage signal is rectified by a full wave rectifying bridge 43 having a separate biasing network 44. It is coupled through a resistor 45 and appears at the node B of control circuit 63 for application to the transistors 65, 66 through the resistors 67, 68 respectively. The input circuit for the control circuit is connected through a resistor 69 to the node B for disabling the operation of the wave generators 10 and 10A. As already mentioned in conjunction with the description of FIGURE 1, when a ground level signal is supplied at the terminal A, the synchronizing voltage developed across the resistors 67, 68 controls the conduction of the transistors 65, 66 and normal operation of the wave generators 10 and 10A ensues. However, when a positive level signal ($+V_1$) is applied to this terminal, the transistors 65 and 66 are rendered conducting to short circuit the capacitors 24 and 24A thereby inhibiting the generation of any pulses. Thus, provided that the input signal at terminal A is at ground level, the transistors 65 and 66 are rendered conductive during each half cycle of the A.C. power supply. The capacitors 24 and 24A are short circuited causing them to discharge, thereby synchronizing the operation of the wave generators 10 and 10A with the powering circuit 13 for the load circuit 12.

Figure 6:
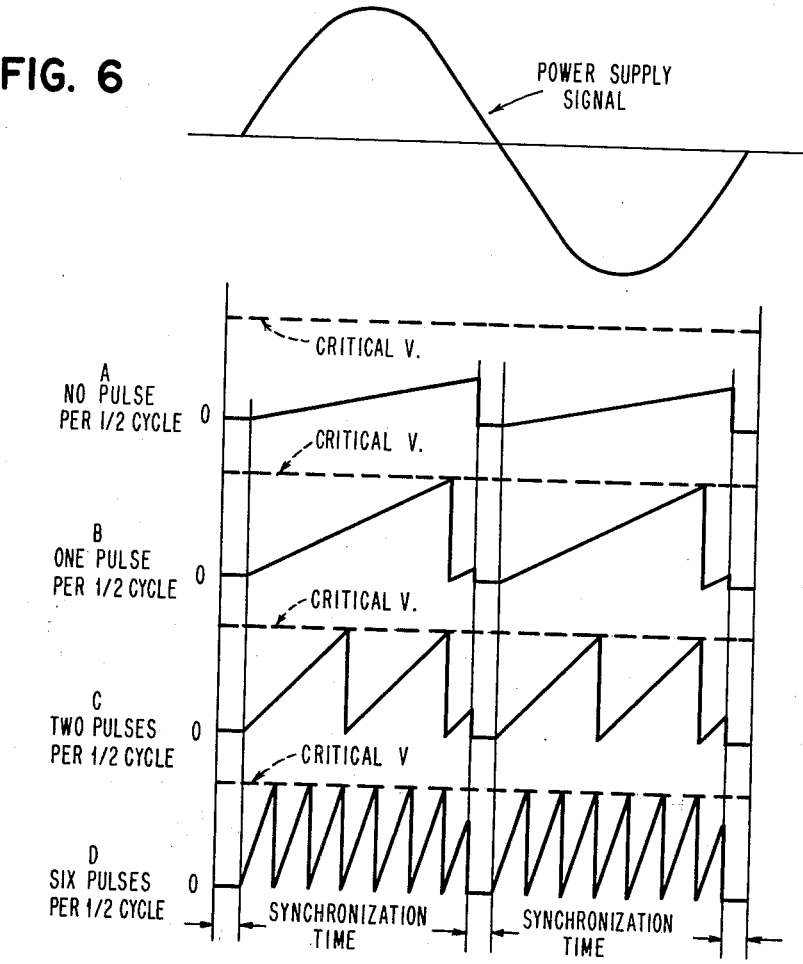
FIGURE 6 is a waveform diagram showing the synchronization and firing operation of the circuit of FIGURE 5.

The operation of this circuit will be better understood by referring to FIGURE 6. As thus far described, it has been assumed that a common mode or zero error signal is applied to the difference amplifier 50 and the potentiometers 59 and 60 of the bias networks have been adjusted to permit the critical voltage of the capacitors 24 and 24A to be reached once each half cycle. One pulse is delivered to the trigger circuit by each generator 10 and 10A per half cycle for controlling the actuation of the load circuit. Since the anodes of the SCR's 26 and 26A are positive only during alternate half cycles of the power supply signal, the pulses supplied by the generators 10 and 10A alternately fire the trigger circuit 11. Diaphragm B of FIGURE 6 indicates this aspect of operation wherein the critical voltage of the capacitors 24 and 24A is achieved once during each half cycle.

The potentiometers 59, 60 of differential amplifier 50 may be adjusted so that in response to the common mode input signal, insufficient current is supplied to the capacitors 24 and 24A to permit a pulse to be delivered to the firing circuit by the wave generators 10 and 10A. This aspect of operation is shown in diagram A of FIGURE 6 wherein the critical voltage of the capacitors is not achieved. In each instance, a synchronizing signal is delivered through the control circuit 63 once each half cycle of the A.C. power supply signal to discharge the capacitors thereby synchronizing the operation of the wave generators 10 and 10A with the powering of the load circuit 12.

By employing the cross-biased difference amplifier, the current values may be adjusted so that sufficient current flows to cause the critical voltage of the capacitors 24 and 24A to be achieved more than once in each synchronizing half cycle. As shown in diagram C, two pulses are supplied in each half cycle by the wave generators 10 and 10A by increasing the currents $I_1$ and $I_2$ by a factor of two and in diagram D six pulses are supplied in each half cycle by increasing the currents by a factor of six. Again, near the end of each half cycle the synchronizing signal renders the transistors 65 and 66 conducting to discharge the capacitors 24 and 24A synchronizing the operation of the wave generators 10 and 10A. It should be understood, however, that this type of operation is normally not required for a balanced condition of the difference amplifier 50. Usually, potentiometers 59 and 60 are adjusted to permit operation according to diagram A or diagram B of FIGURE 6, and diagrams C and D could illustrate the response of one capacitor when a differential input signal is applied at X and Y.

When a differential input signal is supplied to the transistors 51 and 52 at X and Y, more capacitor charging current is produced for one of the wave generators while the other receives less. Thus, if current $I_1$ is increased and current $I_2$ is decreased, the SCR 26 is triggered sooner in the half cycle and the SCR 26A later or not at all. The current flow through SCR 26 to the motor armature of the load circuit 12 causes the motor to rotate in one direction only. Conversely, when current $I_1$ is reduced and current $I_2$ is increased, the SCR 26A is triggered sooner and SCR 26 later or not at all enabling the current delivered through SCR 26A to the motor armature to cause it to rotate in the reverse direction. Thus, if one of the currents is increased sufficiently, it can produce the illustrative two or six pulses per half cycle as shown in diagrams C and D of FIGURE 6.

Consequently, the direction of rotation of the motor is determined by the SCR of the trigger circuit 11 which is first fired. This, in turn, is determined by the current $I_1$ or $I_2$ that is greater. The speed and the direction of motor rotation is determined by the magnitude of the net current flowing through the motor armature which is determined by the difference between $I_1$ and $I_2$. By employing the difference amplifier, therefore, the speed and direction of rotation of the motor, in response to a differential input signal supplied to the transistors 51 and 52, can be varied and accurately controlled. In addition, this controlled circuit is kept in synchronism with the power supply circuit. Furthermore, the entire apparatus can be disabled and generation of pulses inhibited simply by supplying a positive input signal at the terminal A to render the transistors 65 and 66 conductive short circuiting the capacitors 24 and 24A, respectively, to discharge them.

Figure 7:
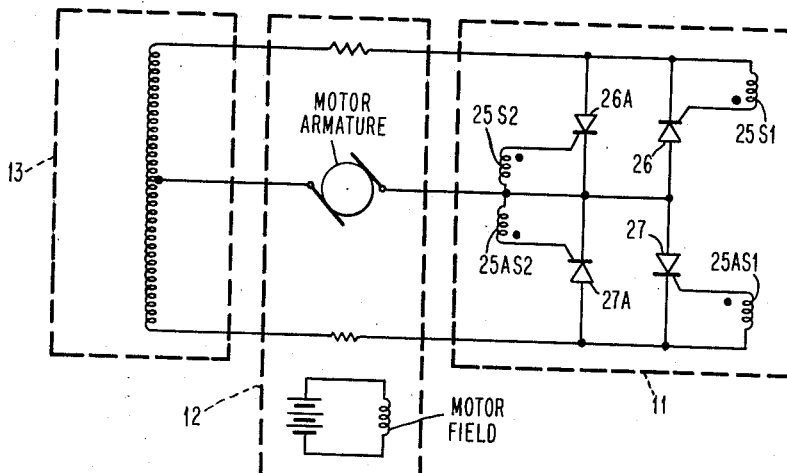
FIGURE 7 is a diagram of the trigger circuit and the load circuit of a full-wave, reversible motor drive employing the same wave generator synchronization as the circuit of FIGURE 5.

The firing circuit, as shown in FIGURE 5, provides half wave control for the load. This may be altered to provide full wave control by substituting the firing circuit shown in FIGURE 7. The same circuits are employed for the cross-biased difference amplifier 50, the wave generators 10 and 10A, the control circuit 63 and the coupling circuit 14. The transformers 25 and 25A are each provided with two isolated secondary windings so that each secondary winding controls an SCR gate. Full wave control has the advantage of generating less heat in the motor armature. In addition, there is less vibration and noise and a more rapid response of the motor.

While this invention has been particularly shown and described with reference to a preferred embodiment thereof, it will be understood by those skilled in the art that the foregoing and other changes in form and details may be made therein without departing from the spirit and scope of the invention.

What is claimed is:

1. A circuit for controlling the operation of a wave generator in synchronism with the powering means for a load circuit driven in response to the operation of the wave generator, comprising a signal responsive device having conducting and nonconducting states of operation coupled to said wave generator and operative when conducting to inhibit the operation of the generator and operative when nonconducting to permit the operation of the generator, means for coupling an input signal residing at either of two levels to said device so that said device is nonconducting in response to the signal at the first level and conducting in response to the signal at the second level, and means coupled to said device and to the powering means for developing a signal to synchronize the operation of said generator with the powering of said load circuit by periodically inhibiting the operation of said wave generator when the input signal is at the first level.

2. A circuit for controlling the operation of a wave generator in synchronism with the powering means for a load circuit driven in response to the operation of the wave generator, comprising a transistor having emitter, base and collector and connected in common emitter circuit configuration with the collector coupled to the wave generator, an input circuit coupled to the base for supplying an input signal residing at either a first or second level, said transistor being responsive to a signal at the first level to be nonconducting permitting said wave generator to be operative and responsive to a signal at the second level to be conducting to inhibit the operation of said wave generator, and means including a transformer coupled to said powering means and rectification means coupled to the transformer and to said input circuit for developing a low voltage signal substantially equal to said second level signal for rendering said transistor conducting to inhibit the operation of said generator periodically thereby synchronizing its operation with said powering means.

3. A circuit for controlling the operation of a wave generator in half wave synchronism with the powering means for a load circuit driven in alternate half cycles of the powering means in response to the operation of the wave generator, comprising a signal responsive device having conducting and nonconducting states of operation coupled to the wave generator and operative when conducting to inhibit the operation of the generator and when nonconducting to permit operation of the generator, means for coupling an input signal residing a either of two levels to said device to permit the device to be nonconducting in response to the signal at the first level and conducting in response to the signal at the second level, and means including transformer means for developing a signal coupled to the powering means and rectifying means coupled to the transformer means and to said device for providing a synchronizing signal substantially equal to the input signal at the second level to render said device conducting during alternate half cycles to inhibit the operation of the generator and once during the other half cycle of the timing cycle of the powering means to synchronize the operation of said wave generator with said powering means.

4. A circuit for controlling the operation of a wave generator in full wave synchronism with the powering means for a load circuit driven in response to the operation of the wave generator, comprising a signal responsive device having conducting and nonconducting states of operation coupled to the wave generator and operative when conducting to inhibit the operation of the generator and when nonconducting to permit operation of the generator, means for coupling an input signal residing at either of two levels to said device to permit the device to be nonconducting in response to the signal at the first level and conducting in response to the signal at the second level, and synchronizing means including transformer means for developing a signal coupled to said powering means and rectifying means coupled to the transformer means and to said input circuit for providing a synchronizing signal substantially equal in magnitude to the input signal at the second level to render said device conducting once during each half cycle of the timing cycle of the powering means to synchronize the operation of said generator with said powering means.

5. In combination,
a wave generator operative periodically to produce pulses,
a trigger circuit responsive to the pulses produced by said wave generator to be fired,
a load circuit having powering means and responsive to the firing of said trigger circuit to be driven by said powering means,
a control circuit coupled to said generator including a signal responsive device having conducting and nonconducting states of operation coupled to said wave generator and operative when conducting to inhibit the operation of the generator and when nonconducting to permit operation of the generator,
means for coupling an input signal residing at either of two levels to said device so that said device is nonconducting in response to the signal at the first level and conducting in response to the signal at the second level,
and means coupled to said device and to the powering means for developing a signal to synchronize the operation of said generator with the powering of said load circuit when said input signal is at the first level.

6. In combination,
a wave generator operative periodically to produce pulses,
a trigger circuit responsive to the pulses produced by said wave generator to be fired,
a load circuit having powering means and responsive to the firing of said trigger circuit to be driven by said powering means,
a control circuit coupled to said generator, including a transistor having emitter, base and collector and connected in common emitter circuit configuration with the collector coupled to the wave generator,
an input circuit coupled to the base for supplying an input signal residing at either a first or second level,
said transistor being responsive to a signal at the first level to be nonconducting thereby permitting operation of said generator and responsive to the signal at the second level to be conducting to inhibit the operation of said generator,
and means including a transformer coupled to said powering means and rectification means coupled to the transformer and to said input circuit for developing a low voltage signal substantially equal in magnitude to said second level input signal for rendering said transistor conducting to inhibit the operation of said generator periodically thereby synchronizing its operation with said powering means.

7. Wave generating apparatus for controlling the driving of a load circuit having powering means, comprising
a wave generator including a unijunction transistor normally biased in a high impedance condition, a transformer connected to the output of the unijunction transistor, and capacitive means coupled to said unijunction transistor and operative periodically to discharge to change the impedance state of said unijunction transistor from said high impedance state to a low impedance state whereby a pulse of current is supplied to said transformer,
a trigger circuit coupled to the output of said transformer and including gating means responsive to a pulse of current delivered by said unijunction transistor to said transformer for permitting said powering means to drive said load circuit,
and a control circuit coupled to said capacitive means and to said unijunction transistor means of said wave generator and including a transistor having emitter, base and collector and connected in common emitter circuit configuration with the collector coupled to the wave generator, and an input circuit coupled to the base for supplying an input signal residing at either a first or second level,
said transistor being responsive to a signal at the first level to be nonconducting permitting operation of said generator and responsive to the signal at the second level to be conducting discharging said capacitor to inhibit the operation of said wave generator,
and means including a transformer coupled to said powering means and rectification means coupled to the transformer and to said input circuit for developing a low voltage signal substantially equal in magnitude to said second level signal for rendering said transistor conducting discharging said capacitor to inhibit the operation of said generator periodically thereby synchronizing its operation with said powering means.

8. In combination,
a pair of wave generators operative to supply pulses of current,
a trigger circuit responsive to the output of each of said generators,
a load circuit driven by powering means when said trigger circuit is fired,
a difference amplifier having its branches coupled to respective ones of said generators for supplying current thereto to control the operation of said generators,
said difference amplifier having provision for independently adjusting the current supplied by said branches to said wave generators, so that in response to a common mode input signal applied to said difference amplifier the current supplied to said wave generators can be controlled permitting said firing circuit to be triggered a predetermined number of times in each timing cycle of the powering means, and so that in response to differential input signals applied to said difference amplifier the current supplied to said wave generators is determined by the difference in potential between said differential input signals,
a control circuit coupled to said generators and including a pair of transistors having emitter, base and collector and connected in common emitter circuit configuration with the collectors coupled to respective ones of the wave generators,
an input circuit coupled to the bases of the transistors for supplying an input signal residing at either a first or second level,
said transitsors being responsive to a signal at the first level to be nonconducting to permit operation of said wave generators in accordance with the current supplied by said difference amplifier and responsive to the signal at the second level to be conducting to inhibit the operation of said wave generator,
and means including a transformer coupled to said powering means and rectification means coupled to the transformer and to said input circuit for developing a low voltage signal substantially equal in magnitude to said second level signal for rendering said transistor conducting to inhibit the operation of said generator periodically thereby synchronizing its operation with said powering means.

9. Wave generating apparatus for controlling the driving of a load circuit having powering means, comprising first and second wave generators,
difference amplifier means connected to drive said first and second generators in response to a differential input signal,
trigger means responsive to the operation of said generators to permit said powering means to drive said load circuit in accordance with the differential input signal,
a control circuit including a pair of transistors each having emitter, base and collector and connected in common collector circuit configuration with the collectors coupled to control respective ones of said generators, means for supplying a signal residing at a first or second level to the base of each of said transistors, said transistors being responsive to a signal at the first level to be nonconducting permitting said generators to be operative in response to said difference amplifier means, and responsive to a signal at the second level to be conducting inhibiting the operation of said generators, and means coupled to said powering means and to said transistors for periodically developing a low voltage signal substantially equal in magnitude to said second level signal to render said transistors conducting thereby periodically inhibiting the operation of said generators to synchronize the generator operation with the powering means.

References Cited by the Examiner
UNITED STATES PATENTS

| | | | |
|---|---|---|---|
| 2,993,145 | 7/61 | Berkery et al. | 307—133 X |
| 3,023,357 | 2/62 | Hierholzer et al. | 307—88.5 |
| 3,069,569 | 12/62 | Singer et al. | 328—74 X |
| 3,088,075 | 4/63 | Pintell | 328—72 |

ARTHUR GAUSS, *Primary Examiner.*